July 14, 1959

K. W. SAVAGE ET AL 2,894,713

IMPULSE VALVE

Filed April 16, 1958

INVENTORS
KENNETH W. SAVAGE
LEONARD H. SAVAGE
BY

Woodhams Blanchard & Flynn
ATTORNEYS

United States Patent Office 2,894,713
Patented July 14, 1959

2,894,713

IMPULSE VALVE

Kenneth W. Savage, Grandville, and Leonard H. Savage, Grand Rapids, Mich., assignors to The Lithibar Company, Holland, Mich., a corporation of Michigan Application April 16, 1958, Serial No. 728,935

3 Claims. (Cl. 251—21)

This invention relates to a valve and, particularly, to a valve of the so-called "impulse" type wherein a single actuation thereof by a manual or mechanical operator effects delivery to a desired port of only a single pulse of pressure fluid.

In many types of remote control devices for actuating material forming equipment, such as plastic molding presses or metalworking machinery, it has been common to use a fluid pressure control circuit including a small, manually operated, relay valve for releasing a pulse of pressure fluid from a master valve. The master valve thereupon initiates and thereafter controls the desired cycle of operation of the equipment being operated. Such devices have long been known and have worked with a reasonable degree of satisfaction. However, it has been observed that in some instances the actuating member of the relay valve is not returned to its original position promptly after actuation thereof. This has been particularly true where the relay valve is controlled mechanically, as by a cam. In such cases, when the operation of the machine is stopped before the actuating cam has released the control element for the relay valve, said relay valve remains open and constantly applies pressure to the master valve and this may cause serious injury thereto or to the equipment controlled thereby. It sometimes becomes necessary to shut down the entire pressure fluid system in order to make repairs on the pressure fluid control valving.

It is therefore desirable to provide a valve construction in which an operating member may be actuated to provide release of pressure fluid from a pressurized zone but in which the flow of pressure fluid will be automatically and promptly terminated even though the operating member of said valve is held in its actuated position.

Persons acquainted with equipment of this type will recognize that a valve of this nature is of wide applicability and it will be understood that the above discussion in connection with the use of this type of valve as a starting valve for automatic machinery merely illustrates one particular situation where the above-mentioned problem arises. Similar problems occur in other uses to which this type of valve may be put and the valve of the present invention may be considered either as conducting a single pulse of pressure fluid from a source to a point of utilization or merely as releasing to a low pressure zone or exhaust a single pulse of pressure fluid from a pressurized zone.

Accordingly, a major object of the invention has been to provide an impulse valve of sufficiently simple construction that it will be economical to fabricate, will require very little maintenance, will be reliable in operation, and will be capable of satisfactory operation over a long period of time and for a very large number of operational cycles.

A further object of the invention has been to provide a valve, as aforesaid, which is equally adaptable to manual or to mechanical actuation.

A further object of the invention is to provide a valve, as aforesaid, which will pass only one pulse of pressure fluid therethrough for each actuation thereof regardless of the length of time the actuating element of the valve remains in its actuated position.

A further object of the invention has been to provide a valve, as aforesaid, which is free from internal parts which as they wear will materially change the accuracy and reliability of the valve. Instead, the present valve utilizes parts whose wear is distributed in such a manner that even over a long period of use, such wear will not appreciably affect the accuracy of operation of said valve.

Other objects and purposes of the invention will be apparent to persons acquainted with devices of this general type upon reading the following disclosure and inspecting the accompanying drawings.

In general

In general, the objects and purposes of the present invention have been accomplished by providing a valve structure including a valve seat between the inlet and outlet ports, an axially reciprocable valve element engageable with said valve seat for controlling the flow of pressure fluid therethrough, a reciprocable actuating member for moving said valve element off said valve seat and a ball member for providing a connection between said valve element and said actuating member. Means are provided for moving said ball member with respect to said actuating member to change the distance between said actuating member and said valve element whereby, in one position of the ball, actuation of said actuating member will effect actuation of said valve element and thereby open the valve and, in another position of said ball, suitable resilient means will close said valve regardless of the position of said actuating member.

Detailed description

Figure 1:
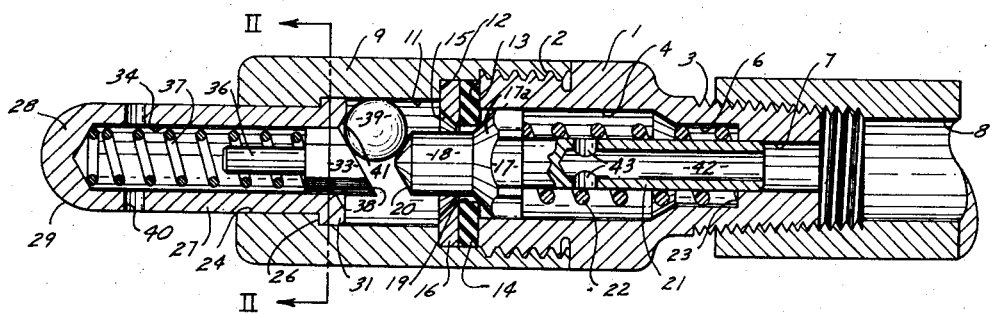
Figure 1 is a central sectional view of the valve.
Figure 2:
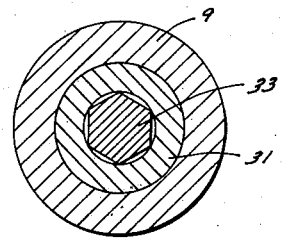
Figure 2 is a sectional view taken along the line II—II of Figure 1.

Referring now to Figure 1, there is shown a valve body 1 having threaded portions 2 and 3 of reduced diameter at either end thereof. The valve body 1 has a coaxial internal chamber 4, which chamber includes a spring-guiding retaining portion 6, preferably of a diameter somewhat reduced with respect to that of the main portion of the chamber 4, and a valve stem guiding portion 7 which is still further reduced in diameter with respect to the spring-guiding portion 6. A fluid pressure supply conduit 8, or other connection to the pressurized zone, is threaded onto the threaded portion 3.

A valve also includes an actuation section 9 threaded onto the threaded portion 2 of the valve body 1. The actuation section 9 has an internal chamber 11 which is provided with an outwardly extending shoulder 12. The shoulder 12 cooperates with the opposing end face 13 of the valve body 1 for retaining therebetween an annular ring member 14 which comprises the valve seat. The member 14 will preferably be made of a suitable resilient material and will normally be backed by a more rigid member 16 to provide the necessary stiffness. The leftward end of the back-up member 16 has a conical annular surface 15 for reasons appearing hereinafter.

A valve element 17 is slidably disposed within the chamber 4 of the valve body 1 and has a stem 18 extending through the central opening 19 in both the seat member 14 and the seat back-up member 16. The leftward end of the stem 18 is conically tapered as indicated at 20 for reasons appearing hereafter. The valve element 17 also has a stem 21 extending therefrom through the spring-retaining portion 6 and, thence, slidably through the central opening in the reduced portion 7. Thus, the valve element 17 is positively guided by contact with the internal wall of the chamber 4 and by contact with the stem 21 thereof with the internal wall of the reduced portion 7. The stem 21 has an axially extending passageway 42 which is open at the end thereof adjacent conduit 8 and which has radially extending ports 43 at the other end thereof communicating with chamber 4. Thus, pressure fluid in conduit 8 communicates with chamber 4. A spring 22 is positioned between the valve element 17 and a shoulder 23 connecting the portions 6 and 7 and urges the valve element 17 against member 14. The chamber 4 is circular in cross-section and valve 17 is hexagonal in cross-section and, thus, fluid under pressure in chamber 4 may pass beyond the major diameter of element 17. However the valve element 17 has a conical portion 17a of circular cross-section for sealingly contacting ring 14.

The actuating section 9 has an actuator guiding portion 24 of reduced diameter. A shoulder 26 extends between the internal surface of portion 24 and the internal wall of the central chamber 11. A valve actuator 27 is slidably disposed within the reduced portion 24. The actuator is closed at its outer end 28 and is provided with a suitable operating structure, such as a rounded external surface 29, which is adapted for engagement with an actuating means, such as a cam (not shown). The actuator 27 is provided at the other end with a radially outwardly extending flange 31 which cooperates with the shoulder 26 for limiting movement of said actuator outwardly of said actuating section 9. The rightward end of the actuator 27 has an internal, annular conical surface 41.

An opening 40 is provided in the actuator 27 adjacent the outer end thereof whereby fluid within said actuator may escape therefrom.

A driver 33 of polygonal, as hexagonal, cross section is slidably arranged within the circular opening 34 in the actuator 27. A stem 36 extends from one end of the driver 33 and centers a spring 37 which is arranged between said driver and the outermost end of the opening 34 in the actuator 27. The spring 22 will be somewhat stronger than the spring 37 for reasons appearing hereinafter. The other end of said driver is provided with a flat surface 38 arranged at a substantial angle, such as about 60 degrees, with respect to the axis of said driver and the stem 18 of the valve 17.

A movable connector, herein a ball 39, is arranged in chamber 11 between the driver 33 and the stem 18. The ball 39 is preferably made of relatively hard, wear resistant material although this is more a matter of convenience than it is of necessity. The diameter of the ball 39 is such that, when it is in the position shown in Figure 1 the valve 17 can rest on the seat 14 and the driver 33 can extend at least partially out of the opening 34, when the ball is in the position shown in Figure 3 the valve 17 will be moved by said ball off the seat 14, and when in the Figure 4 position said ball will be least partially received within opening 34.

Operation

Figure 3:
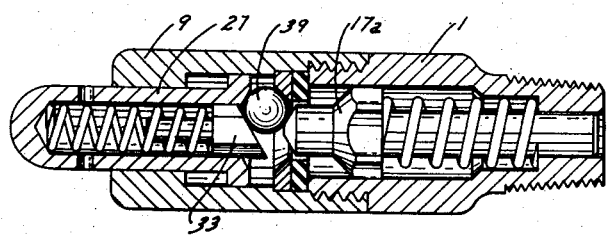
Figure 3 is a sectional view similar to Figure 1 but showing the parts in another operating position.
Figure 4:
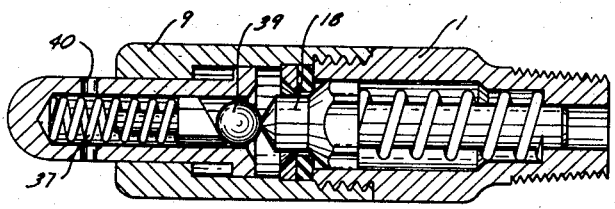
Figure 4 is a sectional view similar to Figure 1 but showing the parts in still another operating position.

The operation of the valve will be described by reference to Figures 1, 3 and 4 showing said valve in three different positions of operation.

Commencing with the valve in the "at rest" position as shown in Figure 1, it will be assumed that fluid under pressure is applied from the conduit 8 through the passageway 42 and outlet openings 43 in the stem 21 to pressurize chamber 4. However, the spring 22 holds the valve 17 closed and the fluid can pass no further than the valve member 14. The ball 39 is trapped between the conical surface 20 and the slanting surface 38 and the wall of the chamber 11.

When it is desired to actuate the valve to pass a pulse of pressure fluid through the valve structure, the actuator 27 is depressed in a suitable manner, such as by a cam, or alternately, by manual depression of said actuator. As the actuator 27 moves rightwardly the ball 39 is forced to move rightwardly and bears against the surface 20 to move the valve element 17 off the seat 14. This permits flow of pressure fluid from the chamber 4 past the valve element 17 and valve seat 14 into the chamber 11, thence past the flat sides of the polygonal driver 33 to the interior of actuator 27, from whence it finally passes to the low pressure side of the system through the ports 40. When the ball 39 and the conical surface 41 have moved to the position shown in Figure 3, the ball 39 is urged by said surface together with the conical surface 15 toward the center of the chamber 11. As the ball is moved inwardly toward the central axis of the chamber 11 toward the Figure 4 position thereof, said ball pushes the driver 33 leftwardly within opening 34. The ball 39 eventually becomes substantially co-axial with the central axis of the chamber 11, at which time it will move axially within opening 34 under the urging of spring 22 regardless of the position of the actuator 27. This permits the valve element 17 to promptly close against the valve seat 14 and terminate the flow of pressure fluid from the chamber 4 to the chamber 11.

Thereafter and as long as the actuator 27 is depressed, springs 37 and 22 act on diametrically opposed portions of the ball 39 in opposite directions and will securely hold the ball in the Figure 4 position. Thus, it will be seen that regardless of the length of time that the actuator 27 is depressed, the valve element 17 will permit only a momentary passage of pressure fluid past the valve seat 14 and will then close.

When the actuator 27 is released, the reaction of the spring 37 against the leftward internal end of said actuator will move said actuator leftwardly until the flange 31 again abuts against the shoulder 26. The ball 39, being free to move, will move by the slanted surface 38 upwardly to the position shown in Figure 1 ready for the next cycle of operation.

It will be recognized that by using a ball for the element between the driver 33 and the stem 18, and since the ball will rotate freely during the many of the various stages of operation, the operation of the valve will be more reliable and accurate than it would be if the driver and stem were connected by a linkage whose connecting pins or bearings would wear and thereby change the distance between said parts during the various phases of the operation. While it is advisable to use an extremely hard material, such as stainless steel or carbide, for the ball 39, it will be recognized that since wear of the ball is uniform, it is not necessary to use a ball of such wear-resistant characteristics except to avoid frequent replacement of said ball. Even if said ball is of soft material and wears rapidly, the wear will be uniform and the operation of the valve will not be impaired.

It will be apparent that the valve can be used with pressure sources of different value and the only structural change that may be required to accommodate a different pressure source would be to change the springs 37 and 22 and even this change would not be necessary unless the values of the pressure sources are materially different.

Although a particular preferred embodiment of the invention has been disclosed hereinabove for illustrative purposes, it will be understood that variations of such disclosure, which lie within the scope of the appended claims, are fully contemplated.

What is claimed is:

1. A valve structure for delivering only a short pulse of pressure fluid upon actuation of an actuating member, comprising in combination: an elongated housing having a first chamber at one axial end thereof and a second chamber at the other axial end thereof; means defining a valve seat between said chambers; an inlet for pressure fluid connected to said first chamber and an outlet for pressure fluid connected to said second chamber; an elongated valve element axially disposed and movable within said first chamber and first spring means acting thereon for urging same into closed position against said valve seat, said valve element having an extension lying within said second chamber; a valve actuating element positioned within said second chamber and movable axially therewithin, said valve actuating element extending outwardly of said second chamber; a ball disposed within said second chamber and positioned between the adjacent ends of said extension and said valve actuating element; said valve actuating element having an axially extending central opening of larger diameter than said ball; driver means within said opening and movable axially with respect thereto, said driver means and said extension having deflecting surfaces for normally urging said ball out of axial alignment with said driver means and into driving engagement with and between said valve actuating means and said extension; means defining a deflecting surface adjacent said valve seat for moving said ball into axial alignment with said driver means when said ball approaches said valve seat; second spring means normally urging said driver into contact with said ball, said second spring means being of lesser strength than said first spring means.

2. A valve structure for delivering only a short pulse of pressure fluid upon actuation of an actuating member, comprising in combination: an elongated housing having a first chamber at one axial end thereof and a second chamber at the other axial end thereof and coaxial with said first chamber; annular ring means of lesser internal diameter than the diameters of said chambers defining a valve seat between said chambers, said last-named means including a coaxial conical guide surface on the end thereof adjacent said second chamber; an inlet for pressure fluid connected to said first chamber and an outlet for pressure fluid connected to said second chamber; an elongated valve rod disposed within said first chamber and having an enlarged valve element adapted to sealingly contact said valve seat; a first coil spring surrounding said valve rod and positioned between said valve element and the opposite axial end of said first chamber for normally urging said valve element into a closed position sealingly contacting said valve seat, said valve rod having an extension extending through said ring means into said second chamber, said extension having a frusto-conical end; a tubular valve actuating element positioned coaxially within said second chamber and movable axially therewithin, said valve actuating element extending outwardly from said second chamber; a driver positioned within said valve actuating element and slidably movable therewithin, said driver having an end face extending transversely of the axis of said housing at a substantial angle but less than 90°, said end face being opposed to said frusto-conical end of said extension; a second coil spring within said valve actuating element urging said driver outwardly and normally positioning same within said second chamber spaced from said frusto-conical end of said extension, said second spring being of lesser strength than said first spring; and a ball positioned within said second chamber between the end face of said driver and said frusto-conical end of said extension, said ball being of lesser diameter than the diameter of the internal opening in said tubular valve actuating element, said end face of said driver normally holding said ball out of axial alignment therewith, said ball being movable toward said first chamber and into contact with said guide surface in response to movement of said valve actuating element, said ball thereupon being moved by said guide surface into axial alignment with said driver so that said first spring will force said ball into said internal opening and will move the valve element into closed position.

3. A valve structure, comprising in combination: an elongated housing having a first chamber at one axial end thereof and a second chamber at the other axial end thereof; a valve seat between said chambers; an inlet for pressure fluid connected to said first chamber and an outlet for pressure fluid connected to said second chamber; an elongated valve element in said first chamber and axially movable therewithin; first force means acting on said valve element for urging same into closed position against said valve seat, said valve element having an extension extending into said second chamber; a valve actuating element positioned within said second chamber and movable axially therewithin; a ball disposed within said second chamber and positioned between the adjacent ends of said extension and said valve actuating element; means defining a recess of larger size than said ball within said housing and communicating with said second chamber and means in said recess for normally positioning said ball out of axial alignment with said recess and in driving contact with said valve actuating element and said extension when same are spaced apart from each other the maximum distance, said ball when out of axial alignment providing a mechanical connection between said valve actuating element and said extension such that axial movement of said valve actuating element toward said extension effects a corresponding axial movement of said extension and said valve element to move same into an open position; deflecting means adjacent said valve seat for moving said ball into axial alignment with said recess when said valve actuating element is adjacent said valve seat and means for moving said ball into said recess at that time so that the mechanical connection between the valve actuating element and the extension provided by said ball is removed whereupon said valve element is urged into closed position against said valve seat by said first force means.

References Cited in the file of this patent

UNITED STATES PATENTS

| | | |
|---|---|---|
| 1,114,397 | Sloan | Oct. 20, 1914 |
| 1,849,129 | Wright | Mar. 15, 1932 |
| 1,912,937 | George | June 6, 1933 |